United States Patent
Jitsukawa et al.

(10) Patent No.: US 8,660,228 B2
(45) Date of Patent: Feb. 25, 2014

(54) COMMUNICATION SYSTEM, INFORMATION TRANSMISSION METHOD, CODE SETTING METHOD, BASE STATION, AND MOBILE STATION

(75) Inventors: Daisuke Jitsukawa, Kawasaki (JP); Jianming Wu, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 13/301,307

(22) Filed: Nov. 21, 2011

(65) Prior Publication Data
US 2012/0063523 A1 Mar. 15, 2012

Related U.S. Application Data

(63) Continuation of application No. PCT/JP2009/059443, filed on May 22, 2009.

(51) Int. Cl.
*H04L 7/00* (2006.01)
(52) U.S. Cl.
USPC ............ 375/354; 375/220; 375/361; 375/365
(58) Field of Classification Search
USPC .................................. 375/259, 219–220, 285
See application file for complete search history.

(56) References Cited

U.S. PATENT DOCUMENTS

| | | | |
|---|---|---|---|
| 7,900,125 B1 * | 3/2011 | Liu et al. | 714/799 |
| 2006/0140313 A1 * | 6/2006 | Futami et al. | 375/343 |

FOREIGN PATENT DOCUMENTS

| | | |
|---|---|---|
| JP | 3-292019 | 12/1991 |
| JP | 2006-203843 | 8/2006 |
| JP | 2008-236432 | 10/2008 |
| WO | 2005/122263 | 12/2005 |

OTHER PUBLICATIONS

International Search Report issued for corresponding International Patent Application No. PCT/JP2009/059443, dated Jun. 16, 2009.

\* cited by examiner

*Primary Examiner* — Sam K Ahn
*Assistant Examiner* — Janice Tieu
(74) *Attorney, Agent, or Firm* — Myers Wolin, LLC

(57) ABSTRACT

A communication system includes a communication station that converts a value information into a code value based on a corresponding relationship in which a difference between a first value information and a second value information is set to any value equal to or greater than two, where the second value information corresponds to a code value where an error occurs in one bit of the code value corresponding to the first value information.

18 Claims, 18 Drawing Sheets

FIG.7

| CQI index | CQI CODE |
|---|---|
| 0 | 0000 |
| 1 | 0011 |
| 2 | 1101 |
| 3 | 1110 |
| 4 | 0100 |
| 5 | 0010 |
| 6 | 1001 |
| 7 | 1111 |
| 8 | 0101 |
| 9 | 0110 |
| 10 | 1000 |
| 11 | 1011 |
| 12 | 0001 |
| 13 | 0111 |
| 14 | 1100 |
| 15 | 1010 |

FIG.8

| MAPPING PATTERN (CQI CODE) | | | CQI index IN PREVIOUS TIME | | | | | | | | | | | | | | | |
|---|---|---|---|---|---|---|---|---|---|---|---|---|---|---|---|---|---|---|
| CQI index THIS TIME | Decimal | Binary | 0 | 1 | 2 | 3 | 4 | 5 | 6 | 7 | 8 | 9 | 10 | 11 | 12 | 13 | 14 | 15 |
| | | | MAPPING PATTERN (Decimal) | | | | | | | | | | | | | | | |
| 0 | 0 | 0000 | 0 | 3 | 13 | 14 | 4 | 2 | 9 | 15 | 5 | 6 | 8 | 11 | 1 | 7 | 12 | 10 |
| 1 | 3 | 0011 | 2 | 2 | 3 | 1 | 1 | 1 | 2 | 4 | 2 | 2 | 1 | 3 | 1 | 3 | 2 | 2 |
| 2 | 13 | 1101 | 3 | 0 | 3 | 3 | 1 | 1 | 2 | 2 | 2 | 2 | 3 | 1 | 1 | 4 | 2 | 2 |
| 3 | 14 | 1110 | 3 | 3 | 0 | 2 | 2 | 4 | 1 | 1 | 1 | 3 | 2 | 2 | 2 | 1 | 1 | 3 |
| 4 | 4 | 0100 | 1 | 3 | 2 | 0 | 2 | 2 | 3 | 1 | 3 | 1 | 2 | 2 | 2 | 1 | 1 | 1 |
| 5 | 2 | 0010 | 1 | 1 | 2 | 2 | 0 | 2 | 3 | 3 | 1 | 1 | 2 | 1 | 4 | 1 | 1 | 3 |
| 6 | 9 | 1001 | 2 | 2 | 4 | 2 | 3 | 3 | 0 | 2 | 3 | 4 | 1 | 1 | 2 | 2 | 3 | 1 |
| 7 | 15 | 1111 | 4 | 2 | 1 | 3 | 1 | 3 | 2 | 0 | 2 | 2 | 3 | 1 | 2 | 2 | 2 | 2 |
| 8 | 5 | 0101 | 2 | 2 | 1 | 1 | 3 | 1 | 3 | 2 | 0 | 2 | 3 | 3 | 1 | 2 | 2 | 2 |
| 9 | 6 | 0110 | 2 | 2 | 1 | 3 | 1 | 3 | 4 | 2 | 2 | 0 | 3 | 3 | 3 | 1 | 2 | 4 |
| 10 | 8 | 1000 | 1 | 3 | 3 | 1 | 2 | 1 | 1 | 3 | 3 | 3 | 0 | 2 | 2 | 1 | 1 | 2 |
| 11 | 11 | 1011 | 3 | 1 | 2 | 2 | 4 | 2 | 1 | 1 | 1 | 3 | 2 | 0 | 2 | 1 | 3 | 1 |
| 12 | 1 | 0001 | 1 | 1 | 2 | 1 | 2 | 2 | 3 | 3 | 3 | 1 | 2 | 2 | 0 | 4 | 3 | 1 |
| 13 | 7 | 0111 | 3 | 1 | 4 | 3 | 2 | 2 | 1 | 1 | 1 | 1 | 4 | 2 | 2 | 2 | 3 | 3 |
| 14 | 12 | 1100 | 2 | 4 | 2 | 3 | 3 | 1 | 3 | 2 | 2 | 2 | 1 | 3 | 3 | 0 | 3 | 2 |
| 15 | 10 | 1010 | 2 | 2 | 3 | 1 | 3 | 1 | 2 | 2 | 4 | 2 | 1 | 1 | 3 | 3 | 2 | 0 |

FIG.9

| CQI index | CQI CODE |
|---|---|
| 0 | 0000 |
| 1 | 1111 |
| 2 | 0001 |
| 3 | 1110 |
| 4 | 0011 |
| 5 | 1100 |
| 6 | 0010 |
| 7 | 1101 |
| 8 | 0110 |
| 9 | 1001 |
| 10 | 0100 |
| 11 | 1011 |
| 12 | 0101 |
| 13 | 1010 |
| 14 | 0111 |
| 15 | 1000 |

FIG.10

| CQI index THIS TIME | MAPPING PATTERN (CQI CODE) Decimal | MAPPING PATTERN (CQI CODE) Binary | CQI index IN PREVIOUS TIME | | | | | | | | | | | | | | | |
|---|---|---|---|---|---|---|---|---|---|---|---|---|---|---|---|---|---|---|
| | | | 0 | 1 | 2 | 3 | 4 | 5 | 6 | 7 | 8 | 9 | 10 | 11 | 12 | 13 | 14 | 15 |
| | | | MAPPING PATTERN (Decimal) | | | | | | | | | | | | | | | |
| | | | 0 | 15 | 1 | 14 | 3 | 12 | 2 | 13 | 6 | 9 | 4 | 11 | 5 | 10 | 7 | 8 |
| 0 | 0 | 0000 | 0 | 4 | 1 | 3 | 2 | 2 | 1 | 3 | 2 | 2 | 1 | 3 | 2 | 2 | 3 | 1 |
| 1 | 15 | 1111 | 4 | 0 | 3 | 1 | 2 | 2 | 3 | 1 | 2 | 2 | 3 | 1 | 2 | 2 | 1 | 3 |
| 2 | 1 | 0001 | 1 | 3 | 0 | 4 | 1 | 3 | 2 | 2 | 3 | 1 | 2 | 2 | 1 | 3 | 2 | 2 |
| 3 | 14 | 1110 | 3 | 1 | 4 | 0 | 3 | 1 | 2 | 2 | 1 | 3 | 2 | 2 | 3 | 1 | 2 | 2 |
| 4 | 3 | 0011 | 2 | 2 | 1 | 3 | 0 | 4 | 1 | 3 | 2 | 2 | 3 | 1 | 2 | 2 | 1 | 3 |
| 5 | 12 | 1100 | 2 | 2 | 3 | 1 | 4 | 0 | 3 | 1 | 2 | 2 | 1 | 3 | 2 | 2 | 3 | 1 |
| 6 | 2 | 0010 | 1 | 3 | 2 | 2 | 1 | 3 | 0 | 4 | 1 | 3 | 2 | 2 | 3 | 1 | 2 | 2 |
| 7 | 13 | 1101 | 3 | 1 | 2 | 2 | 3 | 1 | 4 | 0 | 3 | 1 | 2 | 2 | 1 | 3 | 2 | 2 |
| 8 | 6 | 0110 | 2 | 2 | 3 | 1 | 2 | 2 | 1 | 3 | 0 | 4 | 1 | 3 | 2 | 2 | 1 | 3 |
| 9 | 9 | 1001 | 2 | 2 | 1 | 3 | 2 | 2 | 3 | 1 | 4 | 0 | 3 | 1 | 2 | 2 | 3 | 1 |
| 10 | 4 | 0100 | 1 | 3 | 2 | 2 | 3 | 1 | 2 | 2 | 1 | 3 | 0 | 4 | 1 | 3 | 2 | 2 |
| 11 | 11 | 1011 | 3 | 1 | 2 | 2 | 1 | 3 | 2 | 2 | 3 | 1 | 4 | 0 | 3 | 1 | 2 | 2 |
| 12 | 5 | 0101 | 2 | 2 | 1 | 3 | 2 | 2 | 3 | 1 | 2 | 2 | 1 | 3 | 0 | 4 | 1 | 3 |
| 13 | 10 | 1010 | 2 | 2 | 3 | 1 | 2 | 2 | 1 | 3 | 2 | 2 | 3 | 1 | 4 | 0 | 3 | 1 |
| 14 | 7 | 0111 | 3 | 1 | 2 | 2 | 1 | 3 | 2 | 2 | 1 | 3 | 2 | 2 | 3 | 1 | 0 | 4 |
| 15 | 8 | 1000 | 1 | 3 | 2 | 2 | 3 | 1 | 2 | 2 | 3 | 1 | 2 | 2 | 1 | 3 | 4 | 0 |

FIG.11

| CQI index | CQI CODE |
|---|---|
| 0 | 0000 |
| 1 | 0011 |
| 2 | 0001 |
| 3 | 0010 |
| 4 | 0111 |
| 5 | 1110 |
| 6 | 0110 |
| 7 | 1111 |
| 8 | 1010 |
| 9 | 1001 |
| 10 | 1011 |
| 11 | 1000 |
| 12 | 1101 |
| 13 | 0100 |
| 14 | 1100 |
| 15 | 0101 |

FIG.12

| MAPPING PATTERN (CQI CODE) | | CQI index IN PREVIOUS TIME | | | | | | | | | | | | | | | |
|---|---|---|---|---|---|---|---|---|---|---|---|---|---|---|---|---|---|
| Decimal | Binary | 0 | 1 | 2 | 3 | 4 | 5 | 6 | 7 | 8 | 9 | 10 | 11 | 12 | 13 | 14 | 15 |
| | | MAPPING PATTERN (Decimal) | | | | | | | | | | | | | | | |
| CQI index THIS TIME | | 0 | 0 | 1 | 2 | 7 | 14 | 6 | 15 | 10 | 9 | 11 | 8 | 13 | 4 | 12 | 5 |
| 0 | 0000 | 0 | 3 | 1 | 2 | 3 | 3 | 2 | 4 | 2 | 2 | 3 | 1 | 3 | 1 | 2 | 5 |
| 1 | 0011 | 2 | 2 | 1 | 1 | 1 | 3 | 2 | 2 | 2 | 2 | 1 | 3 | 3 | 1 | 2 | 2 |
| 2 | 0001 | 1 | 0 | 1 | 1 | 2 | 3 | 2 | 3 | 3 | 1 | 1 | 3 | 3 | 3 | 4 | 2 |
| 3 | 0010 | 1 | 1 | 0 | 2 | 2 | 4 | 3 | 3 | 1 | 3 | 2 | 2 | 2 | 2 | 3 | 1 |
| 4 | 0111 | 3 | 1 | 2 | 0 | 2 | 2 | 1 | 3 | 3 | 3 | 2 | 2 | 4 | 2 | 3 | 3 |
| 5 | 1110 | 3 | 3 | 2 | 2 | 1 | 0 | 1 | 1 | 1 | 3 | 2 | 4 | 2 | 2 | 3 | 1 |
| 6 | 0110 | 2 | 2 | 4 | 1 | 1 | 2 | 0 | 1 | 3 | 3 | 2 | 2 | 2 | 2 | 1 | 3 |
| 7 | 1111 | 4 | 2 | 3 | 3 | 3 | 2 | 2 | 2 | 1 | 4 | 3 | 3 | 3 | 1 | 2 | 2 |
| 8 | 1010 | 2 | 2 | 3 | 1 | 2 | 2 | 2 | 0 | 2 | 2 | 1 | 3 | 1 | 3 | 2 | 2 |
| 9 | 1001 | 2 | 2 | 2 | 3 | 2 | 2 | 3 | 2 | 0 | 1 | 1 | 1 | 1 | 3 | 2 | 4 |
| 10 | 1011 | 3 | 1 | 1 | 3 | 2 | 2 | 3 | 1 | 1 | 1 | 0 | 1 | 2 | 3 | 3 | 2 |
| 11 | 1000 | 1 | 3 | 3 | 2 | 4 | 2 | 3 | 3 | 3 | 1 | 2 | 0 | 2 | 4 | 1 | 3 |
| 12 | 1101 | 3 | 3 | 2 | 2 | 2 | 2 | 1 | 1 | 3 | 3 | 2 | 2 | 0 | 2 | 1 | 1 |
| 13 | 0100 | 1 | 3 | 2 | 3 | 2 | 2 | 2 | 3 | 2 | 2 | 4 | 2 | 2 | 0 | 1 | 2 |
| 14 | 1100 | 2 | 4 | 3 | 1 | 3 | 1 | 2 | 2 | 4 | 2 | 3 | 1 | 1 | 1 | 0 | 2 |
| 15 | 0101 | 2 | 2 | 1 | 3 | 1 | 3 | 2 | 2 | 2 | 2 | 3 | 3 | 1 | 1 | 2 | 0 |

FIG.13

| REPORT FORMAT | REPORT CONTENTS | | NUMBER OF TOTAL CONTROL BITS | NUMBER OF BITS OF UCI ELEMENTS | | | | |
|---|---|---|---|---|---|---|---|---|
| | | | | RI | CQI | Subband label | Spatial differential CQI | PMI |
| 1 | Subband CQI | RI=1 | 6 | 0 | 4 | 2 | 0 | 0 |
| 2 | | RI>1 | 9 | 0 | 4 | 2 | 3 | 0 |
| 3 | Wideband CQI/PMI | RI=1 | 8 | 0 | 4 | 0 | 0 | 4 |
| 4 | | RI>1 | 11 | 0 | 4 | 0 | 3 | 4 |
| 5 | RI | | 2 | 2 | 0 | 0 | 0 | 0 |

COMMUNICATION SYSTEM, INFORMATION TRANSMISSION METHOD, CODE SETTING METHOD, BASE STATION, AND MOBILE STATION

CROSS-REFERENCE TO RELATED APPLICATIONS

This application is a U.S. continuation application filed under 35 USC 111(a) claiming benefit under 35 USC 120 and 365(c) of PCT application JP09/059443, filed May 22, 2009. The foregoing application is hereby incorporated herein by reference.

FIELD

The embodiment discussed herein is related to a communication system, an information transmission method, a code setting method, a base station, and a mobile station.

BACKGROUND

Recently, wireless communication systems such as an HSPA (High Speed Packet Access) and LTE (Long Term Evolution) have been developed. In such HSPA and LTE, to achieve higher efficiency and higher reliability data transmission, a technique such as an AMC (Adaptive Modulation and Coding scheme) has been employed.

In the AMC, depending on the quality of a radio channel, an MCS (Modulation and Coding Scheme) of a data signal is performed. Specifically, in the MCS, an appropriate modulation scheme, coding rate, or a combination thereof is selected (controlled). By doing this, while maintaining a predetermined level of the received quality, the MCS having a higher efficiency may be achieved and accordingly the transmission efficiency of data may be improved.

Next, a configuration of a wireless communication system employing the AMC in downlink in the related art is described with reference to FIGS. 1 and 2.

FIG. 1 illustrates an example configuration of a base station in the related art. In FIG. 1, an RF receiver 11 receives a signal fed back from a mobile station, converts the received radio-frequency signal to a baseband signal, performs quadrature demodulation and A/D conversion, and outputs the A/D converted signal to a control signal decoder 12.

The control signal decoder 12 decodes a control signal and extracts a CQI (Channel Quality Indicator) value from the decoded signal. The CQI value indicates a quality of the radio channel by using four-bit data. Herein, the CQI value is calculated based on a radio received quality (e.g., an SINR (Signal-to-Interference and Noise power Ratio)) measured by the mobile station. Further, in this case, the CQI value is calculated so that a BLER (Block Error Rate) is 10% when a data signal having a transmission format corresponding to the CQI value is received.

For example, in the LTE, the modulation, the coding rate, and the number of information bits transmitted in one modulation symbol (Efficiency) correspond to 16 levels (i.e., 1 to 15 levels) of a CQI index. Further, the greater the CQI index is, the greater the quality of a radio channel becomes. The control signal decoder 12 outputs the CQI index to an MCS selector 13. The CQI index is expressed by using four CQI bits which are extracted from the decoded control signal.

The MCS selector 13 selects the MCS of the data signal (i.e., a combination of the modulation and the coding rate) based on the CQI index. Generally, the greater the CQI index is, the higher the efficiency of the selected MCS becomes.

A data signal generator 14 performs error correction coding on the data signal (information bits) so that the coding rate is equal to a value indicated in the MCS. Further, the data signal generator 14 performs data modulation in accordance with the modulation indicated in the MCS. A control signal generator 15 generates a control signal by performing coding, data modulation and the like on the control information including the MCS.

A pilot signal generator 16 generates a pilot signal necessary for decoding the data signal and the control signal and measuring the CQI in the mobile station. A channel multiplexer 17 multiplexes the data signal, the control signal, and the pilot signal and generates a signal in a predetermined radio access scheme (e.g., the OFDMA). An RF transmitter 18 performs D/A conversion and quadrature modulation, converts the baseband signal into the radio-frequency signal, and transmits the radio-frequency signal.

FIG. 2 illustrates an example configuration of a mobile station in the related art. In FIG. 2, an RF receiver 21 receives a signal transmitted from the base station, converts the received radio-frequency signal to a baseband signal, performs quadrature demodulation and A/D conversion, and outputs the A/D converted signal to a channel separation section 22.

The channel separation section 22 separates the input signal into the data signal, the control signal, and the pilot signal by performing receiving processes (e.g., in case of OFDMA, an FFT timing detecting process, a GI removal process, and an FFT process) on the signal in the predetermined radio access scheme (e.g., OFDMA).

An channel estimator 23 estimates a CSI (Channel State Information) of the radio channel by calculating a correlation value between the pilot signal received from the channel separation section 22 and a known pilot signal. The CSI is expressed in a complex number.

A CQI calculator 24 calculates the four-bit CQI index based on the radio received quality (e.g., an SINR) estimated using the CSI. Specifically, as described above, the CQI is calculated so that a BLER (Block Error Rate) is 10% when a data signal having a transmission format corresponding to the CQI is received.

A control signal decoder 25 performs channel compensation on the received control signal from the channel separation section 22 based on the CSI from the CQI calculation section 24. Further, the control decoder 25 restores control information (including the MCS) by performing data demodulation and error correction decoding.

A channel compensator 26 performs channel compensation on the received data signal from the channel separation section 22 based on the CSI from the channel estimator 23. A data signal decoder 27 decodes the data based on the modulation indicated in the MCS from the control signal decoder 25, and restores and outputs information bit data by performing the error correction decoding on the data decoded using the coding rate indicated in the MCS.

A control signal generator 28 generates a control signal by performing coding, data modulation and the like on control information including the four-bit CQI index from the CQI calculator 24. An RF transmitter 29 performs D/A conversion and quadrature modulation, converts the baseband signal into the radio-frequency signal, and transmits the radio-frequency signal to the base station.

Further, there is a proposed technique in which, in LTE, the channel state information and the acknowledgement for the downlink data signal are multiplexed, the multiplexed control signal is channel coded, and the channel-coded signal is transmitted using the uplink control channel (PUCCH) (see, for example, Japanese Laid-open Patent Publication No. 2008-236432).

Whether the AMC can be precisely operated generally depends on a quality of the fed-back CQI index. Especially, when a bit error occurs and the base station cannot detect the bit error in the feedback process, the CQI index greatly different from the CQI index calculated in the mobile station may be decoded. In this case, the MCS greatly different from the optimum MCS for the actual radio channel may be selected. As a result, the data throughput may be greatly degraded.

For example, in an LTE system, the UCI (Uplink Control Information) including the CQI index is transmitted using the physical uplink shared channel (PUSCH) or the physical uplink control channel (PUCCH) depending on the conditions.

Specifically, when there exist the data to be transmitted, the data and the UCI are time-domain multiplexed and the multiplexed data with error detection code bits (CRC) are transmitted by using the PUSCH. On the other hand, however, when there are no data to be transmitted, the UCI without additional CRC bits is transmitted by using the PUCCH.

As described above, when the PUCCH is used, no CRC bits are added. Therefore, when a bit error remains after decoding, it may be difficult to detect the bit error. As a result, as described above, the MCS greatly different from the optimum MCS for the actual radio channel may be selected, and the data throughput may be greatly degraded.

SUMMARY

According to an aspect of the invention, there is provided a communication system where a first communication station converts value information into a code value corresponding to the value information and transmits the code value to a second communication station. The first communication station includes a transmitter that converts the value information into the code value based on a corresponding relationship in which a difference between a first value information and a second value information is set to any value which is equal to or greater than two, the second value information corresponding to a code value where an error occurs in arbitrary one bit of the code value corresponding to the first value information, and transmit the code value converted from the value information to the second communication station. Further, the second communication station includes a receiver that receives the code value from the first communication station, and a detector that detects a possibility of an error in the code value received from the first communication station when determining that a difference between a value information corresponding to a code value received in previous time and a value information corresponding to the code value received this time is any value exceeding a predetermined value which is equal to or greater than two.

The object and advantage of the invention will be realized and attained by means of the elements and combinations particularly pointed out in the claims.

It is to be understood that both the foregoing general description and the following detailed description are exemplary and explanatory and are not restrictive of the invention as claimed.

BRIEF DESCRIPTION OF DRAWINGS

FIG. 7 is a CQI mapping table #1;
FIG. 8 is a corresponding table indicating the error bit number in case of the CQI mapping table #1;
FIG. 9 is a CQI mapping table #2;
FIG. 10 is a corresponding table indicating the error bit number of the CQI mapping table #2;
FIG. 11 is a CQI mapping table #3;
FIG. 12 is a corresponding table indicating the error bit number of the CQI mapping table #3;
FIG. 13 illustrates a report format of UCI.

DESCRIPTION OF EMBODIMENT

Figure 1:
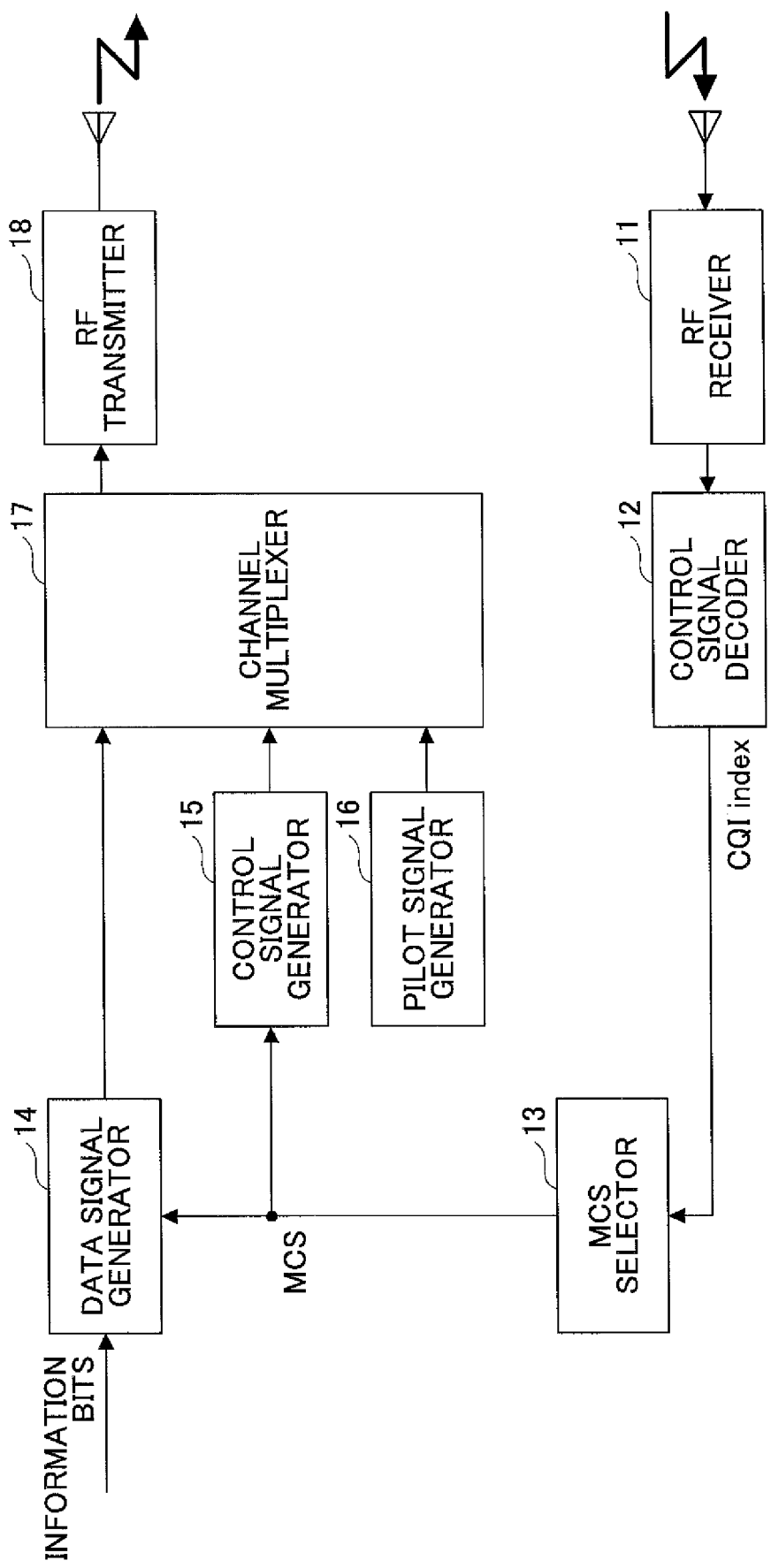
FIG. 1 is a configuration of a base station in the related art.
Figure 2:
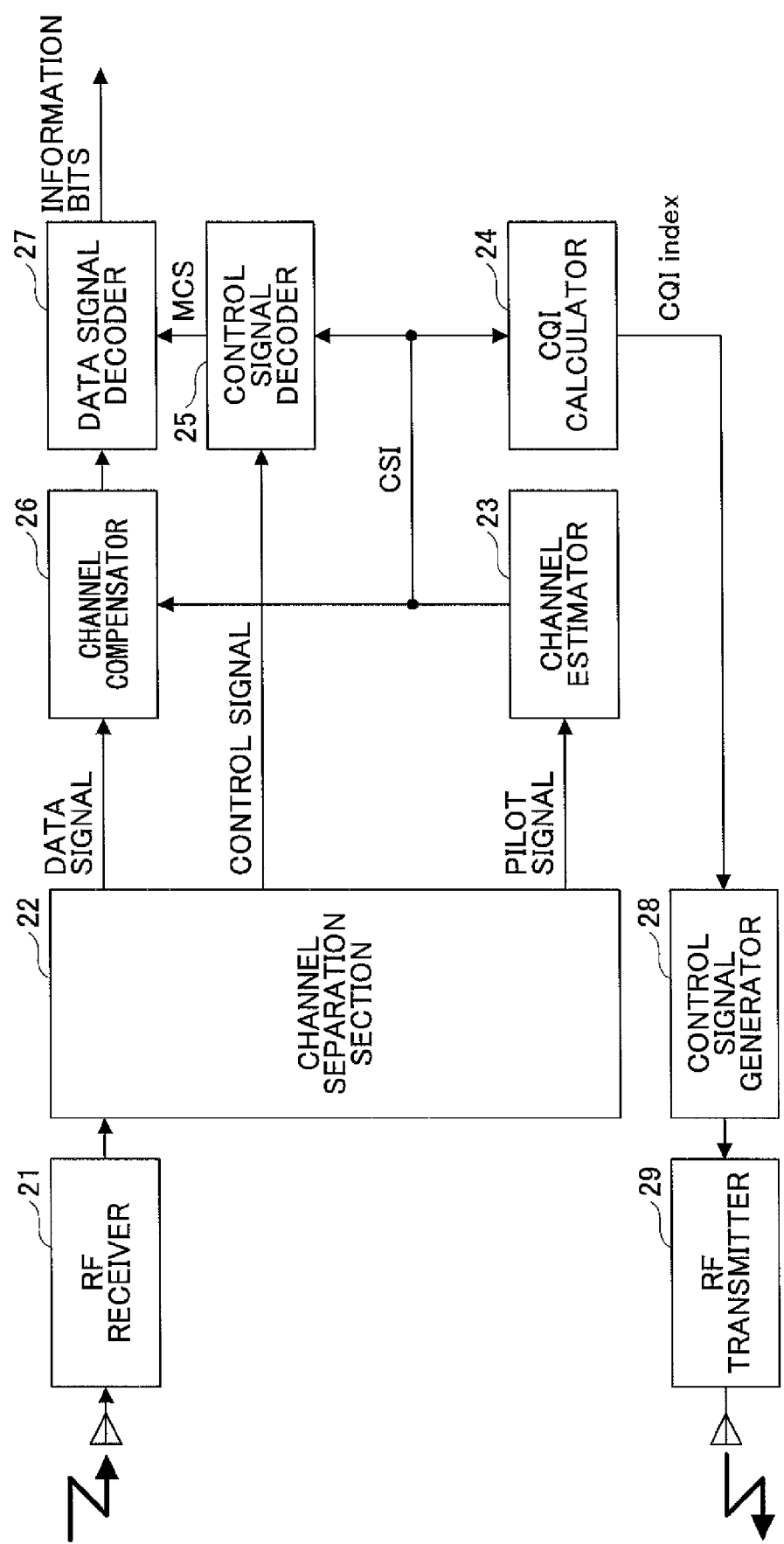
FIG. 2 is a configuration of a mobile station in the related art.

In the following, embodiments are described with reference to the accompanying drawings.

First Embodiment

An example configuration of a wireless communication system according to a first embodiment is described with reference to FIGS. 3 and 4.

In the wireless communication system, a first communication station converts value information into a corresponding code (code value, value of code), and transmits the code (code value) to a second communication station. More specifically, the first communication station includes a transmitter. The transmitter converts the value information into the code value, and transmits the code value to the second communication station. In this case, the value information is converted into the code value based on a (predetermined) corresponding relationship. In the corresponding relationship, a value (difference value) between a first value information and a second value information is set to any value which is equal to or greater than two.

Herein, the second value information corresponds to a code value in which a bit error occurs in one bit of the code value corresponding to the first value information (i.e., when the code value of the second value information and the code value of the first value information are compared, only one bit of the code value of the second value information is different from the code value of the first value information). After converting the value information into the corresponding code value, the transmitter transmits the code value to the second communication station.

The second communication station includes a receiver and a detector. The receiver receives the code value from the first communication station. The detector detects a possibility of an error in the code value when the value (difference value) between the value information corresponding to the code value previously received and the value information corresponding to the code value received this time is a predetermined value equal to or greater than two.

Next, a case is described where a bit error occurs in one bit of a code value (e.g., 0011) corresponding to a certain value information (e.g., 1) during the transmission from the first communication station to the second communication station. In this case, as a result of the bit error, any one of the code values "1"011, 0"1"11, 00"0"1, and 001"0" is received. However, according to the relationship between the value information and the code values, any of the value information corresponding to those code values 1011, 0111, 0001, and 0010 is set to any value which is different from the value information "1" by equal to or greater than 2. For example, the value information of 1011, 0111, 0001, and 0010 are set to 11, 13, 12, and 5.

Therefore, when the second communication station receives the code value 0011 as the code value in the previous time (previously) and further wrongly receives any of the code values 1011, 0111, 0001, and 0010 this time (currently, presently), the second communication station detects (recognizes) that the value information has changed from 1 to any one of 11, 13, 12, and 5. Since the difference value is a predetermined value which is equal to or greater than 2 (which is a value less than the minimum changed value (e.g., 2, 3, 4) of the value information when the bit error occurs in one bit), it becomes possible to determine that there is a possibility of an error.

In the above description, a case is described where the code value transmitted from the first communication station is maintained (unchanged). However, in a case where the value information changes (by, for example, ±1), when an error occurs in the code value corresponding to the changed value information, the value information different from any one of the value information before the change and the value information after the change is detected. Therefore, it may become possible to detect the possibility that an error occurs.

However, the smaller the change of the value information is, the higher the detection accuracy becomes. Therefore, in a case where, for example, the second communication station receives the radio received quality value or a CQI (Channel Quality Indicator) value having small changes from the first communication station, when this embodiment is applied by regarding the radio received quality value or the CQI value (CQI) as the value information and regarding the CQI code having a predetermined length as the code value, it may become possible to effectively detect an error in the CQI code.

In the following descriptions, it is assumed that the first communication station is a mobile station and the second communication station is a base station. The present invention, however, may also be applied to any other configurations such as communication stations performing data transmission with each other.

Figure 3:
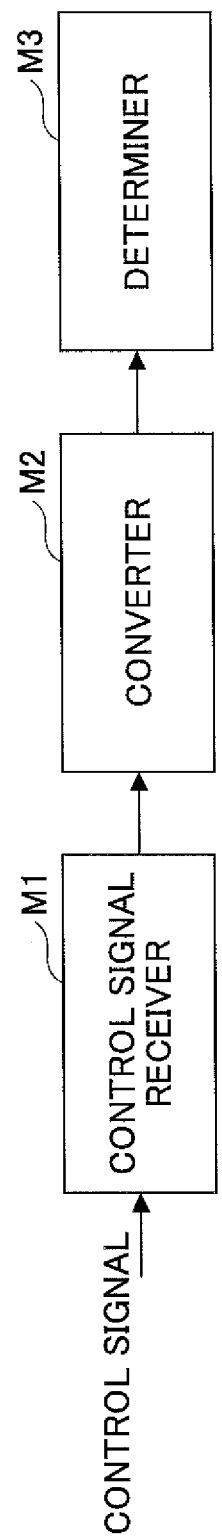
FIG. 3 is an example configuration of a base station according to a first embodiment.

FIG. 3 illustrates an example configuration of the base station according to the first embodiment. In FIG. 3, a control signal receiver M1 receives a control signal transmitted from a mobile station. A converter M2 converts a code value having a predetermined length (fixed length) (a value of a code having a predetermined length) included in the received control signal into the CQI value.

The code value having the predetermined length is determined in a manner such that the difference (difference value) between the CQI value converted from the code value having the predetermined length in which a bit error occurs in a predetermined number of bits and the CQI value converted from the code value having the predetermined length in which no bit error occurs is equal to a predetermined value which is equal to or greater than two.

A determiner M3 determines that an error occurs in the code value having the predetermined length received this time when detecting that a difference (difference value) between the CQI value converted from the code value having the predetermined length received in the previous time and the CQI value converted from the code value having the predetermined length received this time is equal to a predetermined value which is equal to or greater than two.

Figure 4:
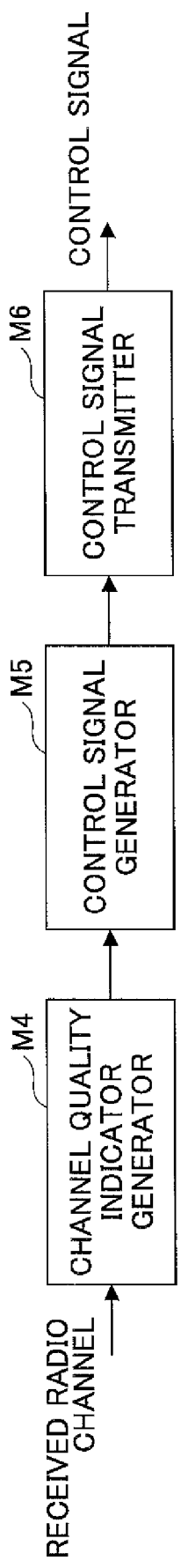
FIG. 4 is an example configuration of a mobile station according to the first embodiment.

FIG. 4 illustrates an example configuration of the mobile station according to the first embodiment. In FIG. 4, a Channel Quality Indicator generator M4 generates the CQI value of the received radio channel. A control signal generator M5 converts the CQI value into the code value having the predetermined length, and generates a control signal including the converted signal (code value). In this case, an error detecting coding process may not be performed on the converted signal.

The code value having the predetermined length is determined such that the difference (difference value) between the CQI value in which a bit error occurs in a predetermined number of bits and the CQI value in which no bit error occurs is equal to a predetermined value which is equal to or greater than two. A control signal transmitter M6 transmits the control signal to the base station, the control signal being supplied from the control signal generator M5.

Second Embodiment

An example configuration of a wireless communication system according to a second embodiment is described with reference to FIGS. 5 and 6.

Figure 5:
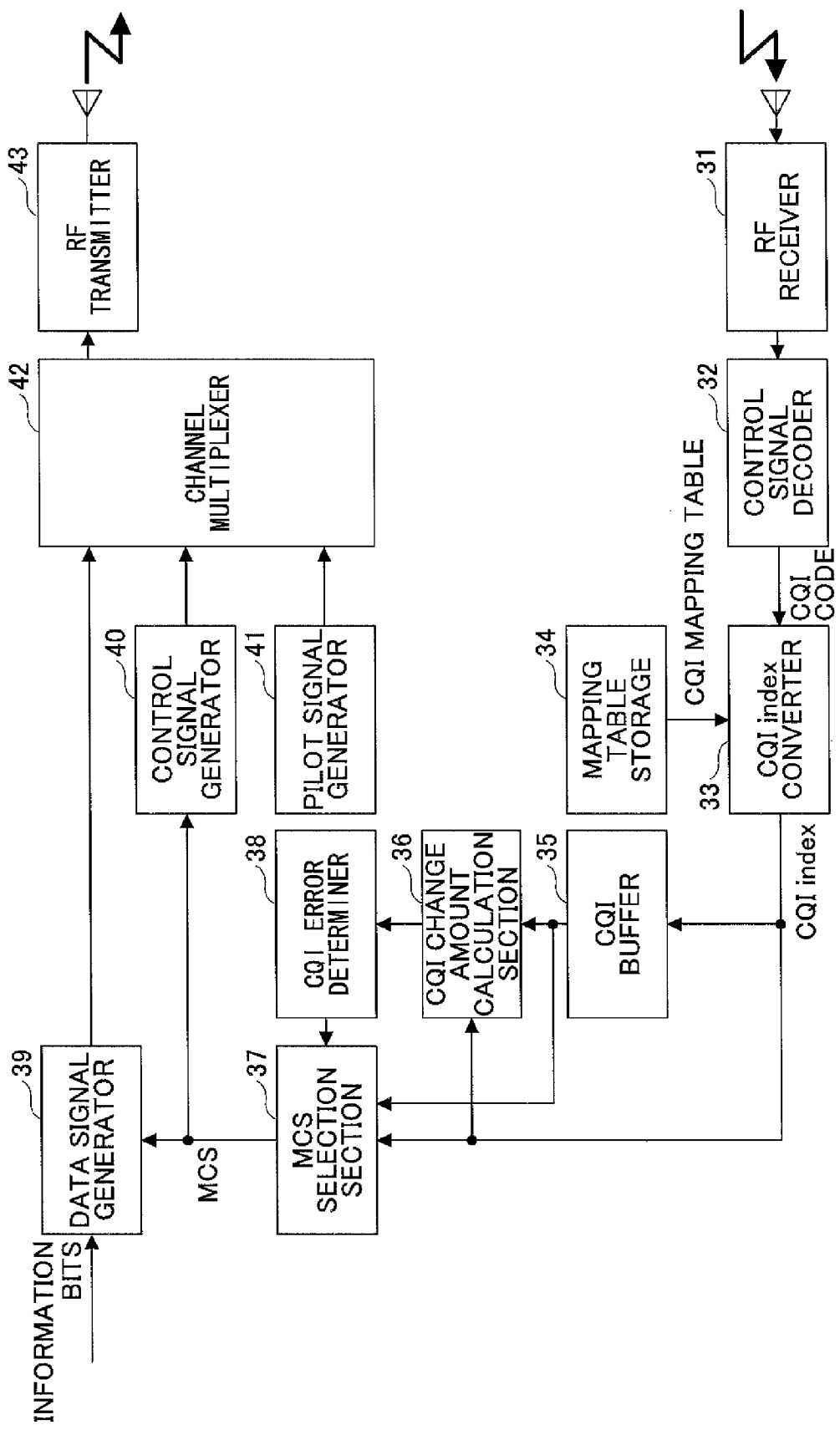
FIG. 5 is an example configuration of the base station according to a second embodiment.

FIG. 5 illustrates an example configuration of the base station according to the second embodiment. In FIG. 5, an RF receiver 31 receives a signal fed back from the mobile station, converts the radio-frequency signal to the baseband signal, performs quadrature demodulation and A/D conversion, and transmits the A/D converted signal to a control signal decoder 32.

The control signal decoder 32 performs decoding process on the control signal and extracts four-bit CQI code from the decoded control signal, the CQI code indicating the quality of the radio signal.

Herein, the CQI value which becomes a base of the CQI code is calculated based on the received SINR measured by the mobile station. More specifically, the CQI is calculated so that the BLER is 10% when a data signal having a transmission format corresponding to the CQI is received.

For example, in the LTE, the modulation, the coding rate, and the number of information bits transmitted in one modulation symbol correspond to 16 levels (i.e., 1 to 15 levels) of the CQI index. Further, the greater the CQI index is, the greater the quality of a radio channel becomes. The CQI code is generated by expressing the CQI index by using four bit data.

A mapping table storage 34 stores a CQI mapping table #1 indicating a corresponding relationship between the CQI index and the CQI code as illustrated in, for example, FIG. 7. Details of the CQI mapping table is described below.

A CQI index converter 33 determines the CQI index based on the four-bit CQI code extracted by the control signal decoder 32 and by referring the CQI mapping table #1 in the mapping table storage 34. The CQI index converter 33 supplies the determined CQI index to a CQI buffer 35, a CQI change amount calculating section 36, and an MCS selecting section 37.

The CQI buffer 35 accumulates the CQI index fed back in the past (in the previous time). The CQI change amount calculating section 36 calculates a CQI index change amount indicating a difference amount between the CQI index fed back in the previous time from the CQI buffer 35 and the CQI index fed back this time from the CQI index converter 33 (hereinafter simplified as a CQI index change amount). The CQI change amount calculating section 36 supplies the calculated CQI index change amount to a CQI error determiner 38.

The CQI error determiner 38 determines that a bit error is included in the CQI code (i.e., CQI index) fed back this time when the CQI index change amount is equal to or greater than a predetermined error determination threshold value. Then, the CQI error determiner 38 supplies the determination result to the MCS selecting section 37.

The MCS selecting section 37 selects the MCS of the data signal (i.e., a combination of the modulation and the coding rate). Generally, the greater the CQI index is, the higher the efficiency of the selected MCS becomes.

When the CQI error determiner 38 determines that a bit error is included in the CQI index, this determination result may be used when the MCS selecting section 37 selects the MCS. For example, it may be possible to determine that the CQI index fed back this time is not reliable, so that the MCS is selected based on the CQI index fed back in the previous time. Alternatively, for example, it is also possible to skip the transmission one time.

A data signal generator 39 performs the error correction coding on the data signal (i.e., information bit) so that the coding rate corresponds to the value indicated in the MCS, and further performs a data modulation based on the modulation indicated in the MCS. A control signal generater 40 generates a control signal by performing processes including coding and data modulations on the control information including the MCS.

A pilot signal generator 41 generates a pilot signal necessary for decoding the data signal and the control signal and measuring the CQI in the mobile station. A channel multiplexer 42 multiplexes the data signal, the control signal, and the pilot signal, and generates a signal based on a predetermined radio access scheme (e.g., OFDMA). An RF transmitter 43 performs D/A conversion and quadrature modulation, converts the baseband signal into the radio-frequency signal, and transmits the radio-frequency signal.

Figure 6:
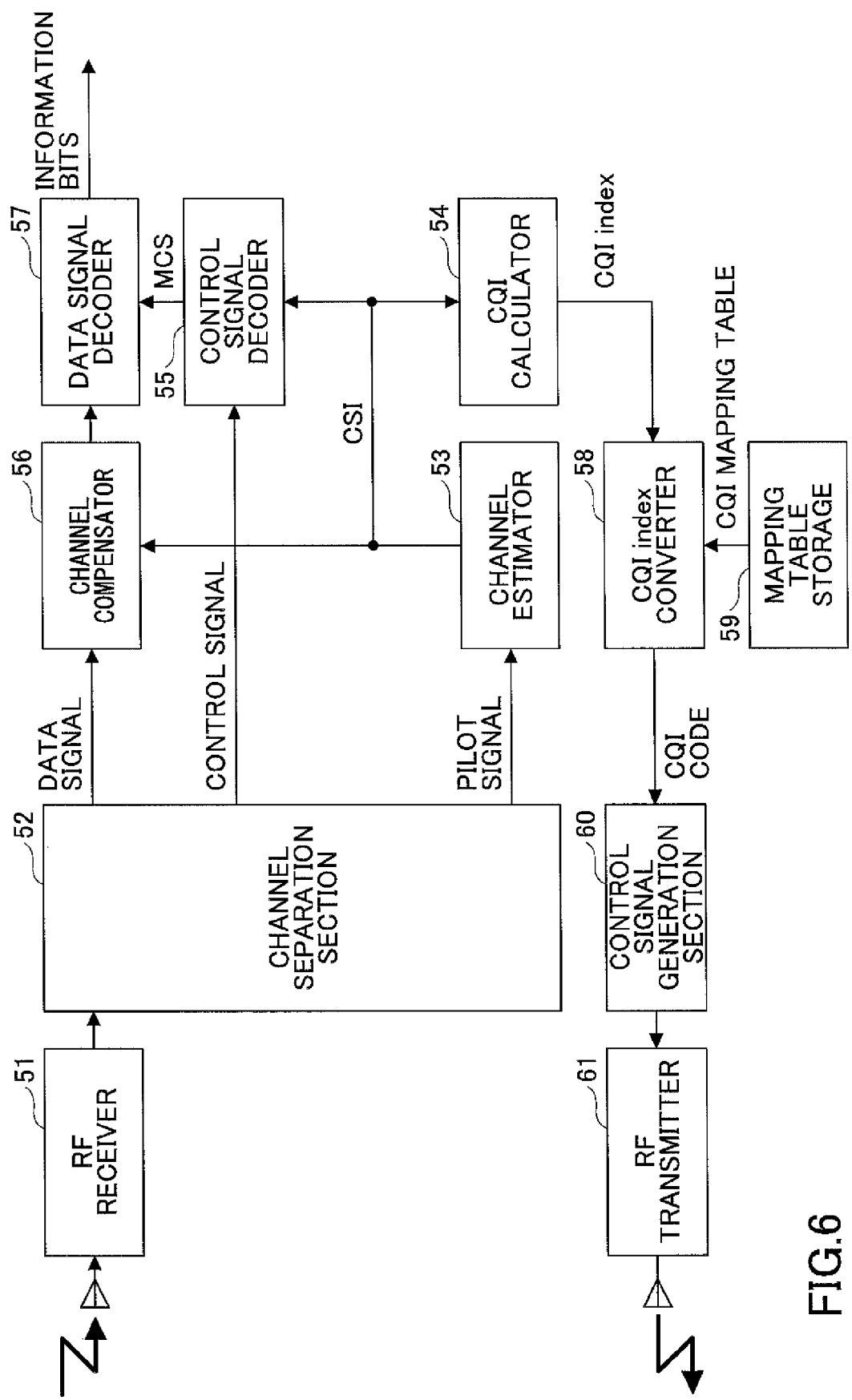
FIG. 6 is an example configuration of the mobile station according to the second embodiment.

FIG. 6 illustrates an example configuration of the mobile station according to the second embodiment. In FIG. 6, an RF receiver 51 receives a signal transmitted from the base station, converts the radio-frequency signal to the baseband signal, performs quadrature demodulation and A/D conversion, and transmits the A/D converted signal to a channel separation section 52.

The channel separation section 52 separates the input signal into the data signal, the control signal, and the pilot signal by performing receiving processes (e.g., in case of OFDMA, the FFT timing detecting process, the GI removal process, and the FFT process) on the signal in the predetermined radio access scheme (e.g., OFDMA).

The channel estimator 53 estimates the CSI (Channel State Information) of the radio channel by calculating a correlation value between the pilot signal from the channel separation section 52 and a known pilot signal. The CSI is expressed in a complex number.

A CQI calculator 54 calculates the CQI index based on the radio received quality (e.g., an SINR) estimated using the CSI. Specifically, as described above, the CQI index is calculated so that the BLER is 10% when a data signal having a transmission format corresponding to the CQI is received.

A control signal decoder 55 performs channel compensation on the received control signal from the channel separation section 52 based on the CSI from the channel estimator 53. Further, the control signal decoder 55 restores the control information (including the MCS) by performing data demodulation and error correction decoding.

A channel compensator 56 performs channel compensation on the received data signal from the channel separation section 52 based on the CSI from the channel estimator 53. A data decoder 57 decodes the data based on the modulation indicated in the MCS from the control signal decoder 55, and restores and outputs the information bit data by performing the error correction decoding on the data decoded using the coding rate indicated in the MCS.

A mapping table storage 59 stores a CQI mapping table #1 indicating a corresponding relationship between the CQI index and the CQI code as illustrated in, for example, FIG. 7. A CQI index converter 58 determines the four-bit CQI code based on the CQI index calculated by the CQI calculator 54 and by referring the CQI mapping table #1 in the mapping table storage 59. The CQI index converter 58 supplies the determined CQI code to a control signal generating section 60.

The control signal generating section 60 generates a control signal in accordance with a PUCCH format by performing processes such as coding and data modulation on the control information including the four-bit CQI code. An RF transmitter 61 performs D/A conversion and quadrature modulation on the control signal, converts the baseband signal into the radio-frequency signal, and transmits the radio-frequency signal to the base station.

CQI Mapping Table #1

A combination between the CQI mapping table and the error determination threshold value is described. Herein, it is assumed that while the CQI code (i.e., the CQI index) is fed back twice the change in the radio channel is limited in a predetermined range. Namely, it is assumed that, in most cases, a cause of the difference between the CQI code transmitted first and the CQI code transmitted later is a bit error.

FIG. 8 is a corresponding table indicating the number of error bits in combination between the CQI code this time (a current CQI code) (arranged in the vertical direction) and the CQI code in the previous time (a previous CQI code) (arranged in the lateral direction) when the CQI mapping table #1 of FIG. 7 is used. Namely, for example, in a case where the CQI code this time is "0000" (binary), when the CQI code in the previous time is "0000", the number of error bits is zero. Further, in a case where the CQI code this time is "0000", when the CQI code in the previous time is "0011", the number of error bits is two. Further, in a case where the CQI code this time is "0000", when the CQI code in the previous time is "1101", the number of error bits is three. Further, in a case where the CQI code this time is "0000", when the CQI code in the previous time is "1110", the number of error bits is three. Further, in a case where the CQI code this time is "0000", when the CQI code in the previous time is "0100", the number of error bits is one.

Namely, the CQI mapping table #1 in FIG. 7 is designed so that the CQI index may greatly differs to some extent when an bit error occurs in one bit of the CQI code. In FIG. 8, when a bit error occurs in one bit of the CQI code, the difference between the CQI indexes always corresponds to a value equal to or more than four (i.e., exceeds three). Further, when a bit error occurs in two bits of the four bits, the difference between the CQI indexes corresponds to a value equal to or more than four (i.e., exceeds three) at high probability. Therefore, in the CQI error determiner 38, when the error determination threshold value is set to four, it may become possible to precisely detect the bit error occurred in one bit of the CQI code.

CQI Mapping Table #2

Instead of storing the CQI mapping table #1 of FIG. 7, a CQI mapping table #2 in FIG. 9 may be stored in the mapping table storage 34 of FIG. 3 and the mapping table storage 59 of FIG. 4.

FIG. 10 is a corresponding table indicating the number of error bits in combination between the CQI code this time (arranged in the vertical direction) and the CQI code in the previous time (arranged in the lateral direction) when the CQI mapping table #2 of FIG. 9 is used. Namely, for example, in a case where the CQI code this time is "0000" (binary), when the CQI code in the previous time is "0000", the number of error bits is zero. Further, in a case where the CQI code this time is "0000", when the CQI code in the previous time is "1111", the number of error bits is four. Further, in a case where the CQI code this time is "0000", when the CQI code in the previous time is "0001", the number of error bits is one. Further, in a case where the CQI code this time is "0000", when the CQI code in the previous time is "1110", the number of error bits is three.

Namely, the CQI mapping table #2 in FIG. 9 is designed so that the CQI index may greatly differs to some extent when an bit error occurs in two bits of the CQI code. In FIG. 10, when a bit error occurs in two bits of the CQI code, the difference between the CQI indexes always corresponds to a value equal to or more than three (i.e., exceeds two). Further, when a bit error occurs in three bits of the four bits, the difference between the CQI indexes corresponds to a value equal to or more than three at high probability. Therefore, in the CQI error determiner 38, when the error determination threshold value is set to three, it may become possible to precisely detect the bit error occurred in two bits of the CQI code.

CQI Mapping Table #3

Instead of storing the CQI mapping table #1 of FIG. 7 or the CQI mapping table #2 of FIG. 9, a CQI mapping table #3 in FIG. 11 may be stored in the mapping table storage 34 of FIG. 3 and the mapping table storage 59 of FIG. 4.

FIG. 12 is a corresponding table indicating the number of error bits in combination between the CQI code this time (arranged in the vertical direction) and the CQI code in the previous time (arranged in the lateral direction) when the CQI mapping table #3 of FIG. 11 is used. Namely, for example, in a case where the CQI code this time is "0000" (binary), when the CQI code in the previous time is "0000", the number of error bits is zero. Further, in a case where the CQI code this time is "0000", when the CQI code in the previous time is "0011", the number of error bits is two. Further, in a case where the CQI code this time is "0000", when the CQI code in the previous time is "0001", the number of error bits is one. Further, in a case where the CQI code this time is "0000", when the CQI code in the previous time is "0010", the number of error bits is one. Further, in a case where the CQI code this time is "0000", when the CQI code in the previous time is "0111", the number of error bits is three.

Namely, the CQI mapping table #3 in FIG. 11 is designed so that the CQI index may greatly differ to some extent when an bit error occurs in three bits of the CQI code. In FIG. 12, when a bit error occurs in three bits of the CQI code, the difference between the CQI indexes always corresponds to a value equal to or more than four (i.e., exceeds three). Further, when a bit error occurs in two bits of the four bits, the difference between the CQI indexes corresponds to a value equal to or more than four at high probability. Therefore, in the CQI error determiner 38, when the error determination threshold value is set to four, it may become possible to precisely detect the bit error occurred in two bits of the CQI code.

As described above, in the embodiment described above, when the number of error bits in the CQI code is a predetermined value, the error may be precisely detected. However, when the number of error bits in the CQI code is other than the predetermined value, the error may not be precisely detected. Therefore, the frequency distribution of the number of error bits may be examined in advance, so that the mapping table corresponding to the number of error bits estimated to have the highest frequency is used. By doing this, it may become possible to reduce the probability of not detecting the bit error in all the cases including the case where the number of error bits is other than the error bits estimated to have the highest frequency.

Third Embodiment

In the LTE system, a method of reporting the UCI in the PUCCH differs depending on the antenna configuration of the base station, the system bandwidth, the transmission mode, and the transmission timing. For example, when the base station has a four transmission antennas and the closed-loop spatial multiplexing transmission is employed as the transmission mode, there are plural report formats as illustrated in FIG. 13 are provided. In the description, for explanatory purposes, those formats are called report formats 1 through 5, respectively.

The elements of the UCI in FIG. 13 may be defined as follows. The "RI" denotes a Rank Indicator indicating the optimum spatial multiplexing number (MIMO multiplexing number) selected by the mobile station. The "CQI" denotes a target CQI code where the bit error is detected. The "Subband label" denotes the subband number when the CQI index is reported for each of the subbands. The "Spatial differential CQI" denotes the information related to a second CQI index defined when the spatial multiplexing number is equal to or greater than two. The information, however, is not the target information where the bit error is detected in this embodiment.

The "PMI" denotes a Precoding Matrix Index which indicates an index number of the optimum precoding matrix selected by the mobile station. Incidentally, upon the downlink transmission, the mobile station performs the precoding which is a type of the transmission beam forming, and plural candidates having respective index numbers are provided as the precoding matrixes.

The report format may be divided as follows. In the report format, different report periods are set based on the notice from an upper layer and switched in the time domain. In the report of the subband CQI, the subband number corresponding to the subband having the greatest channel quality and the CQI code based on the averaged channel quality among the plural subbands divided from the system frequency are reported. Herein, the report format may differ depending on the latest RI value.

In the report of the wideband CQI/PMI, the CQI code based on the channel quality averaged across the entire system bandwidth and the optimum PMI are reported. The report format may differ depending on the latest RI value.

As described above, when the CQI code is transmitted using the PUCCH in the LTE system, there may exist plural report formats corresponding to the combination of the control information simultaneously transmitted. As a result, the number of control bits in the report formats may not be the same as each other.

When the number of the total control bits including the CQI code differs, the coding rate of the error correction code may differs. Therefore, the frequency distribution of the number of error bits may change. Therefore, depending on the number of the total control bits including the CQI code, the mapping tables most appropriate for the respective report formats may be used. An example configuration of the base station in this embodiment is described below.

Figure 14:
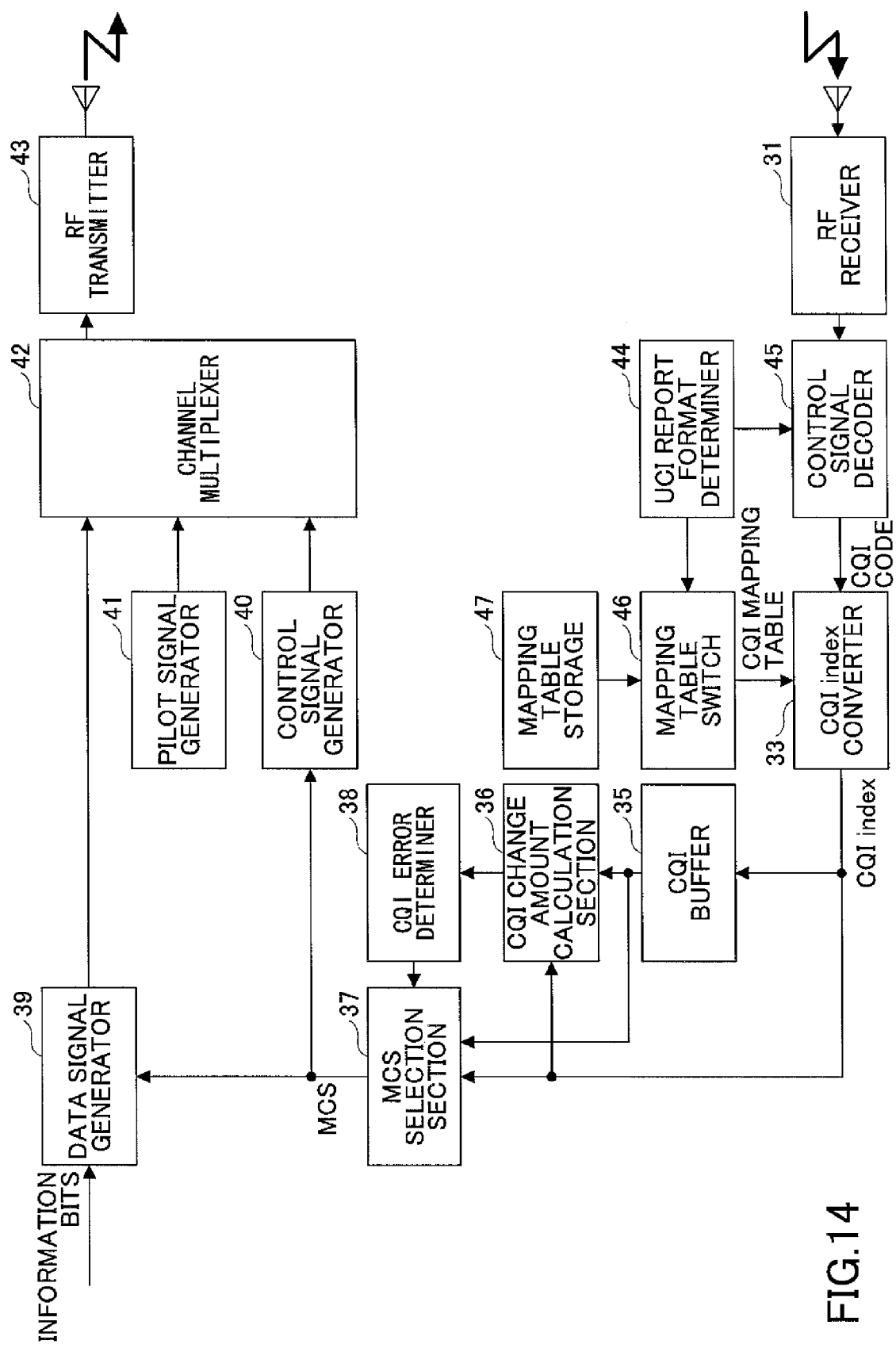
FIG. 14 is an example configuration of the base station according to a third embodiment.

FIG. 14 illustrates an example configuration of the base station in the third embodiment. In FIG. 14, the same reference numerals are used to describe the same elements as those in FIG. 5. In FIG. 14, the RF receiver 11 receives a signal fed back from the mobile station, converts the received radio-frequency signal to a baseband signal, performs quadrature demodulation and A/D conversion, and outputs the A/D converted signal to a control signal decoder 45.

Figure 15:
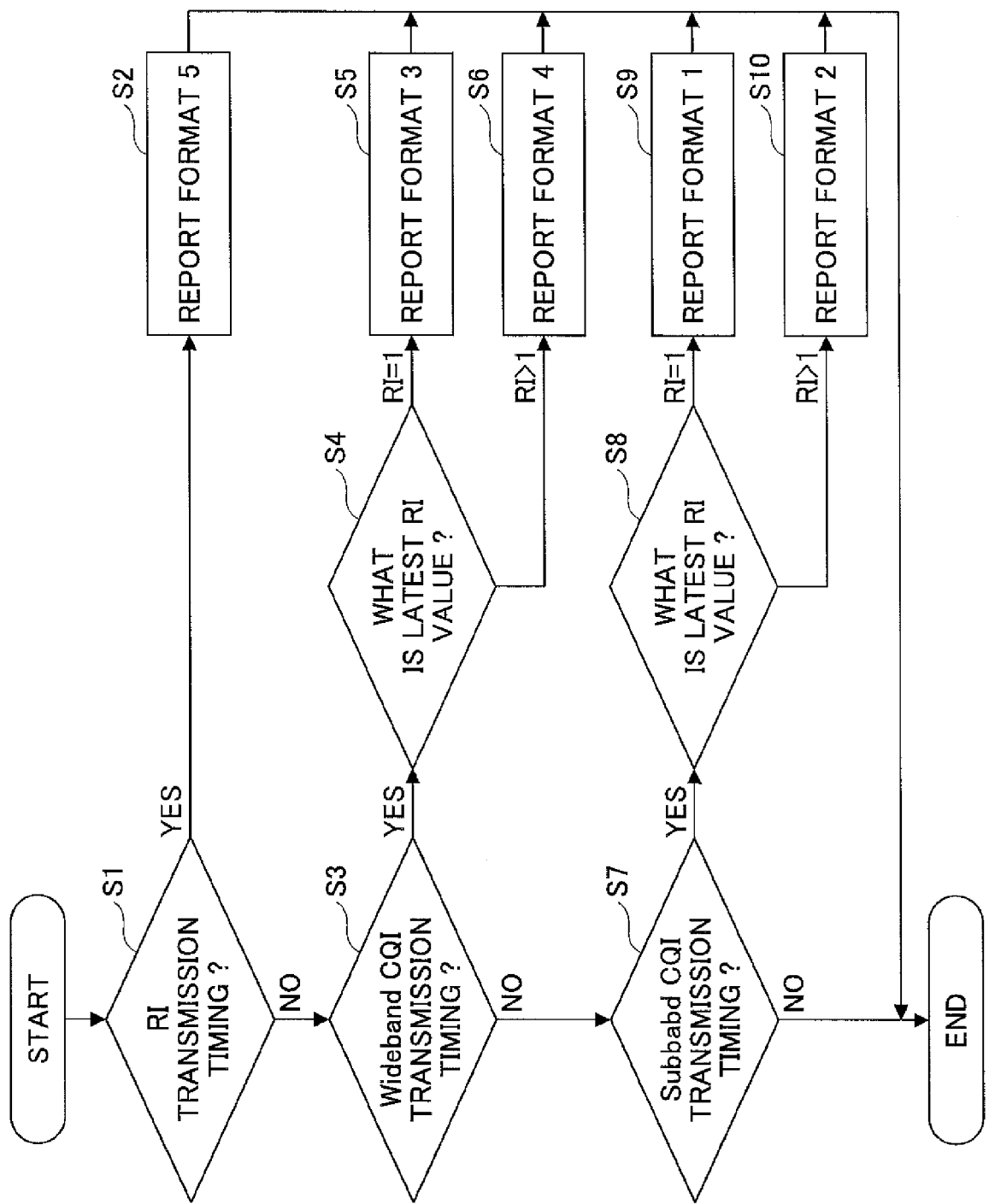
FIG. 15 is an example flowchart illustrating a report format determination process.

A UCI report format determiner 44 determines the format of the control signal from the mobile station received this time, the format being compliant with one of the report formats in FIG. 13. Specifically, as illustrated in FIG. 15, the UCI report format determiner 44 determines the format by comparing the report cycles of the report formats of the UCI with the current time, the report cycles being quasi-statically set based on the notice from an upper layer. Further, the UCI report format determiner 44 reports the determined report format to the control signal decoder 45.

FIG. 15 is an example flowchart illustrating a report format determination process performed by the UCI report format determiner 44. As illustrated in FIG. 15, in step S1, the UCI report format determiner 44 determines whether it is the RI transmission timing. When determining that it is the RI transmission timing, the UCI report format determiner 44 determines that the report format corresponds to the report format 5 in step S2.

When determining that the it is not the RI transmission timing, the UCI report format determiner 44 determines whether it is the wideband CQI/PMI transmission timing in step S3. When determining that it is the wideband CQI/PMI transmission timing, the UCI report format determiner 44 determines whether the latest RI value is one in step S4. When determining that the RI value is one, the UCI report format determiner 44 determines that the report format corresponds to the report format 3 in step S5. When determining that the RI value is greater than one, the UCI report format determiner 44 determines that the report format corresponds to the report format 4 in step S6.

On the other hand, when determining that it is not the wideband CQI/PMI transmission timing, the UCI report format determiner 44 determines whether it is the subband CQI transmission timing in step S7.

When determining that it is the subband CQI transmission timing, the UCI report format determiner 44 determines whether the latest RI value is one in step S8. When determining that the RI value is one, the UCI report format determiner 44 determines that the report format corresponds to the report format 1 in step S9. When determining that the RI value is greater than one, the UCI report format determiner 44 determines that the report format corresponds to the report format 2 in step S10.

The control signal decoder 45 performs the decoding process on the control signal, and extracts an appropriate four-bit CQI code from the decoded control signal based on the UCI report format.

A mapping table storage 47 stores, for example, the CQI mapping tables #1, #2, and #3 of FIGS. 7, 9, 11, respectively as the mapping tables optimum for the respective variations of the numbers of control bits.

A mapping table switch 46 selects the optimum mapping tables depending on the numbers of the total control bits from the mapping table storage 47, and outputs the selected mapping tables to the CQI index converter 33. The selection to select the optimum mapping tables is performed based on the frequency distribution of the number of error bits examined in advance. For example, it is assumed that when the number of the total control bits is six bits or less, the highest frequency is observed when a bit error occurs in three bits of the four-bit CQI code. Further, it is assumed that when the number of the total control bits is eight bits or more, the highest frequency is observed when a bit error occurs in three bits of the four-bit CQI code. In this case, it may be preferable that the CQI mapping tables #3 is used for the report format 1 and the CQI mapping tables #2 is used for the report formats other than the report format 1.

The CQI index converter 33 determines the CQI index based on the four-bit CQI code extracted by the control signal decoder 45 and by referring any one of the CQI mapping tables #1, #2, and #3 from the mapping table switch 46. Further, the CQI index converter 33 supplies the determined CQI index to a CQI buffer 35, a CQI change amount calculating section 36, and an MCS selecting section 37.

The CQI buffer 35 accumulates the CQI index fed back in the past (in the previous time). The CQI change amount calculating section 36 calculates the CQI index change amount indicating a difference amount between the CQI index fed back in the previous time from the CQI buffer 35 and the CQI index fed back this time from the CQI index converter 33 (i.e., CQI index change amount). The CQI change amount calculating section 36 supplies the calculated CQI index change amount to a CQI error determiner 38.

The CQI error determiner 38 determines that a bit error is included in the CQI code (i.e., CQI index) fed back this time when the CQI index change amount is equal to or greater than a predetermined error determination threshold value. Then, the CQI error determiner 38 supplies the determination result to the MCS selecting section 37.

The MCS selecting section 37 selects the MCS of the data signal (i.e., a combination of the modulation and the coding rate). Generally, the greater the CQI index is, the higher the efficiency of the selected MCS becomes.

When the CQI error determiner 38 determines that a bit error is included in the CQI index, this determination result may be used when the MCS selecting section 37 selects the MCS. For example, it may be possible to determine that the CQI index fed back this time is not reliable, so that the MCS is selected based on the CQI index fed back in the previous time. Alternatively, for example, it is also possible to skip the transmission one time.

The data signal generator 39 performs the error correction coding on the data signal (i.e., information bit) so that the coding rate corresponds to the value indicated in the MCS, and further performs the data modulation based on the modulation indicated in the MCS. The control signal generator 40 generates a control signal by performing processes including coding and data modulations on the control information including the MCS.

The pilot signal generator 41 generates the pilot signal necessary for decoding the data signal and the control signal and measuring the CQI in the mobile station. The channel multiplexer 42 multiplexes the data signal, the control signal, and the pilot signal, and generates a signal based on a predetermined radio access scheme (e.g., OFDMA). The RF transmitter 43 performs D/A conversion and quadrature modulation, converts the baseband signal into the radio-frequency signal, and transmits the radio-frequency signal.

Figure 16:
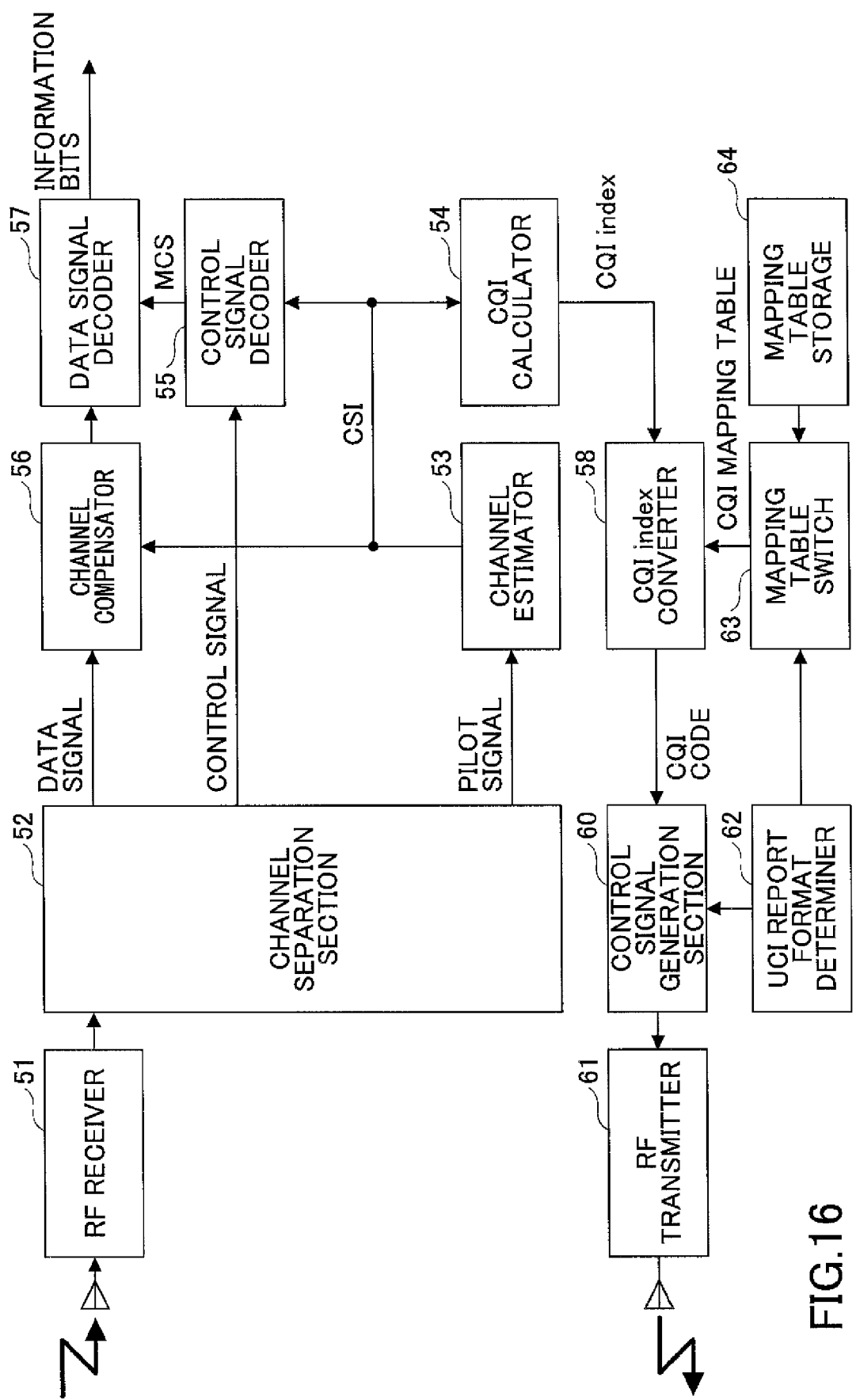
FIG. 16 is an example configuration of the mobile station according to the third embodiment.

FIG. 16 illustrates an example configuration of the mobile station according to the third embodiment. In FIG. 16, the same reference numerals area used to describe the same elements as those in FIG. 6. In FIG. 16, the RF receiver 51 receives a signal transmitted from the base station, converts the radio-frequency signal to the baseband signal, performs quadrature demodulation and A/D conversion, and transmits the A/D converted signal to the channel separation section 52.

The channel separation section 52 separates the input signal into the data signal, the control signal, and the pilot signal by performing receiving processes (e.g., in case of OFDMA, the FFT timing detecting process, the GI removal process, and the FFT process) on the signal in the predetermined radio access scheme (e.g., OFDMA).

The channel estimator 53 estimates the CSI (Channel State Information) of the radio channel by calculating a correlation value between the pilot signal from the channel separation section 52 and a known pilot signal. The CSI is expressed in a complex number.

The CQI calculator 54 calculates the CQI index based on the radio received quality (e.g., an SINR) estimated using the CSI. Specifically, as described above, the CQI index is calculated so that the BLER is 10% when a data signal having a transmission format corresponding to the CQI is received.

The control signal decoder 55 performs channel compensation on the received control signal from the channel separation section 52 based on the CSI from the channel estimator 53. Further, the control signal decoder 55 restores the control information (including the MCS) by performing data demodulation and error correction decoding.

The channel compensator 56 performs channel compensation on the received data signal from the channel separation section 52 based on the CSI from the channel estimator 53. The data decoder 57 decodes the data based on the modulation indicated in the MCS from the control signal decoder 55, and restores and outputs the information bit data by performing the error correction decoding on the data decoded using the coding rate indicated in the MCS.

A UCI report format determiner 62 determines (selects) the report format to be used in the control signal to be transmitted to the base station from among the UCI report formats indicated in FIG. 13. Specifically, similar to the base station, UCI report format determiner 62 determines (selects) the format based on the flowchart in FIG. 15. Further, the UCI report format determiner 62 reports the determined report format to the control signal generating section 60. Also, the UCI report format determiner 62 reports the number of total control bits to a mapping table switch 63.

A mapping table storage 64 stores, for example, the CQI mapping tables #1, #2, and #3 of FIGS. 7, 9, 11, respectively as the mapping tables optimum for the respective variations of the numbers of control bits.

The mapping table switch 63 selects the optimum mapping tables depending on the numbers of the total control bits from the mapping table storage 64, and outputs the selected mapping tables to the CQI index converter 58. The selection to select the optimum mapping tables is performed base on the same rule as that used in the selection performed by the mapping table switch 46.

The CQI index converter 58 determines the CQI code based on the CQI index calculated by the CQI calculator 54 and by referring any one of the CQI mapping tables #1, #2, and #3 from the mapping table switch 63. The CQI index converter 58 supplies the determined CQI code to the control signal generating section 60.

The control signal generating section 60 generates a control signal in accordance with a PUCCH format by performing processes such as coding and data modulation on the control information including the four-bit CQI code. The RF transmitter 61 performs D/A conversion and quadrature modulation on the control signal, converts the baseband signal into the radio-frequency signal, and transmits the radio-frequency signal to the base station.

Fourth Embodiment

As described above, in this embodiment, it is assumed that the change in the radio channel while the CQI code (i.e., the CQI index) is fed back twice is limited in a predetermined range. However, with the increase of the moving speed of the mobile station, the change in time of the radio channel increases. When the moving speed of the mobile station is fast, the CQI index may greatly change while the CQI index is fed back twice. Because of this feature, even when no bit error occurs, it may be determined that the bit error occurs. As a result, a wrong detection may occur.

Therefore, when the moving speed is fast, emphasis may be placed on the reduction of the probability of the wrong detection, and a mapping table (e.g., mapping table #1 or #3) suitable for a case where the error determination threshold value is high may be used. On the other hand, when the moving speed is slow, emphasis may be placed on the reduction of the probability of missing the error detection, a mapping table (e.g., mapping table #2) suitable for a case where the error determination threshold value is low may be used.

Figure 17:
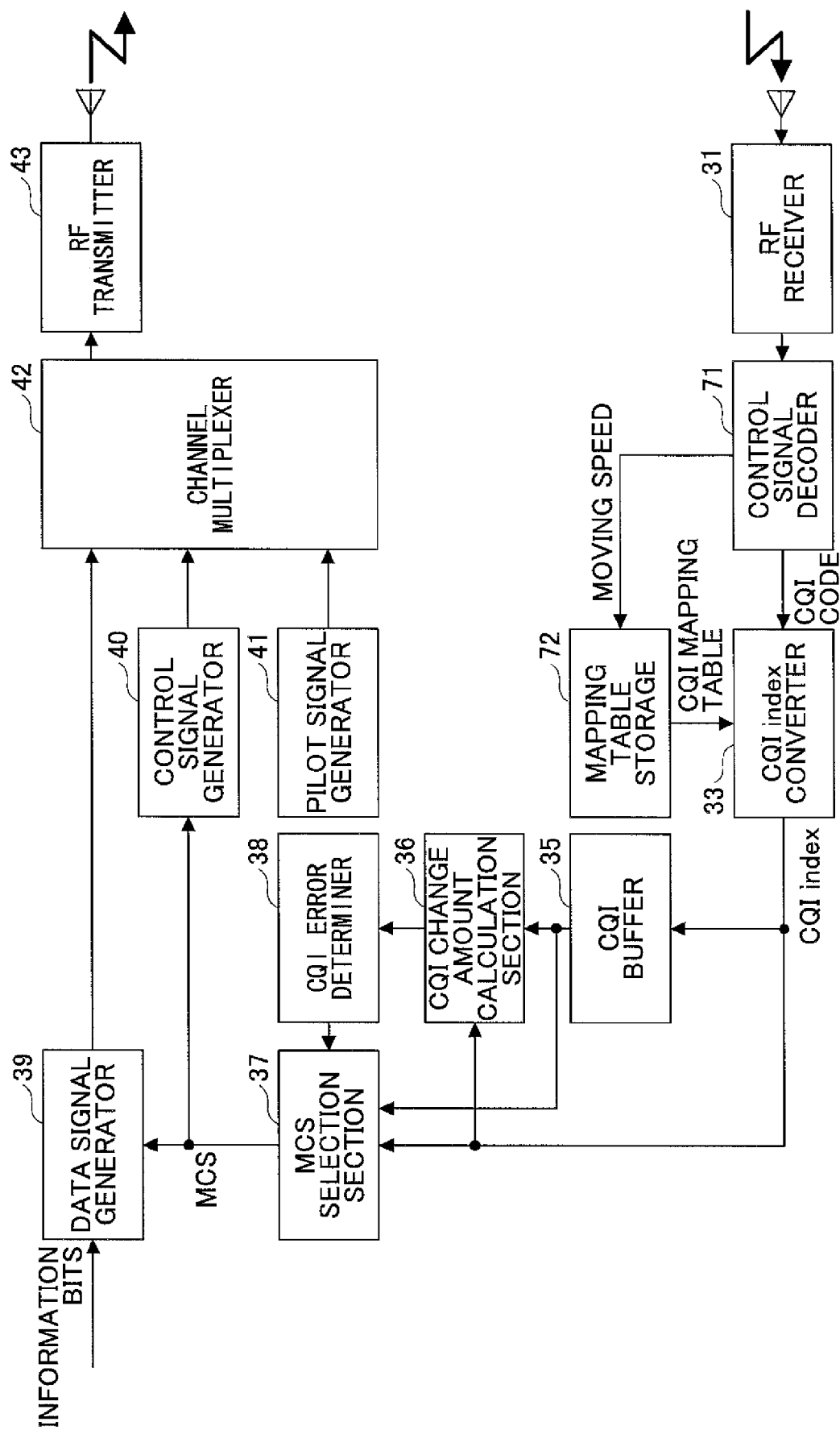
FIG. 17 is an example configuration of the base station according to a fourth embodiment.

FIG. 17 illustrates an example configuration of the base station according to a fourth embodiment. In FIG. 17, the same reference numerals are used to described the same elements as those in FIG. 5. In FIG. 17, the RF receiver 31 receives a signal fed back from the mobile station, converts the radio-frequency signal to the baseband signal, performs quadrature demodulation and A/D conversion, and transmits the A/D converted signal to a control signal decoder 71.

The control signal decoder 71 performs decoding process on the control signal and extracts four-bit CQI code and a speed code which is the control bits indicating the moving speed of the mobile station from the decoded control signal.

A mapping table storage 72 stores, for example, the CQI mapping tables #1, #2, and #3 of FIGS. 7, 9, 11, respectively as the mapping tables optimum for the respective variations of the moving speed. Further, the mapping table storage 72 selects any of the CQI mapping tables #1, #2, and #3 in accordance with the speed code supplied from the control signal decoder 71, and supplies the selected CQI mapping table to the CQI index converter 33.

The CQI index converter 33 determines the CQI index based on the four-bit CQI code extracted by the control signal decoder 71 and by referring any one of the CQI mapping tables #1, #2, and #3 from the mapping table storage 72. Further, the CQI index converter 33 supplies the determined CQI index to the CQI buffer 35, the CQI change amount calculating section 36, and the MCS selecting section 37.

The CQI buffer 35 accumulates the CQI index fed back in the past (in the previous time). The CQI change amount calculating section 36 calculates the CQI index change amount indicating a difference amount between the CQI index fed back in the previous time from the CQI buffer 35 and the CQI index fed back this time (currently) from the CQI index converter 33 (i.e., CQI index change amount). The CQI change amount calculating section 36 supplies the calculated CQI index change amount to the CQI error determiner 38.

The CQI error determiner 38 determines that a bit error is included in the CQI code (i.e., CQI index) fed back this time when the CQI index change amount is equal to or greater than a predetermined error determination threshold value. Then, the CQI error determiner 38 supplies the determination result to the MCS selecting section 37.

The MCS selecting section 37 selects the MCS of the data signal (i.e., a combination of the modulation and the coding rate). Generally, the greater the CQI index is, the higher the efficiency of the selected MCS becomes.

When the CQI error determiner 38 determines that a bit error is included in the CQI index, this determination result may be used when the MCS selecting section 37 selects the MCS. For example, it may be possible to determine that the CQI index fed back this time is not reliable, so that the MCS is selected based on the CQI index fed back in the previous time. Alternatively, for example, it is also possible to skip a transmission one time.

The data signal generator 39 performs the error correction coding on the data signal (i.e., information bit) so that the coding rate corresponds to the value indicated in the MCS, and further performs the data modulation based on the modulation indicated in the MCS. The control signal generator 40 generates a control signal by performing processes including coding and data modulations on the control information including the MCS.

The pilot signal generator 41 generates the pilot signal necessary for decoding the data signal and the control signal and measuring the CQI in the mobile station. The channel multiplexer 42 multiplexes the data signal, the control signal, and the pilot signal, and generates a signal based on a predetermined radio access scheme (e.g., OFDMA). The RF transmitter 43 performs D/A conversion and quadrature modulation, converts the baseband signal into the radio-frequency signal, and transmits the radio-frequency signal.

Figure 18:
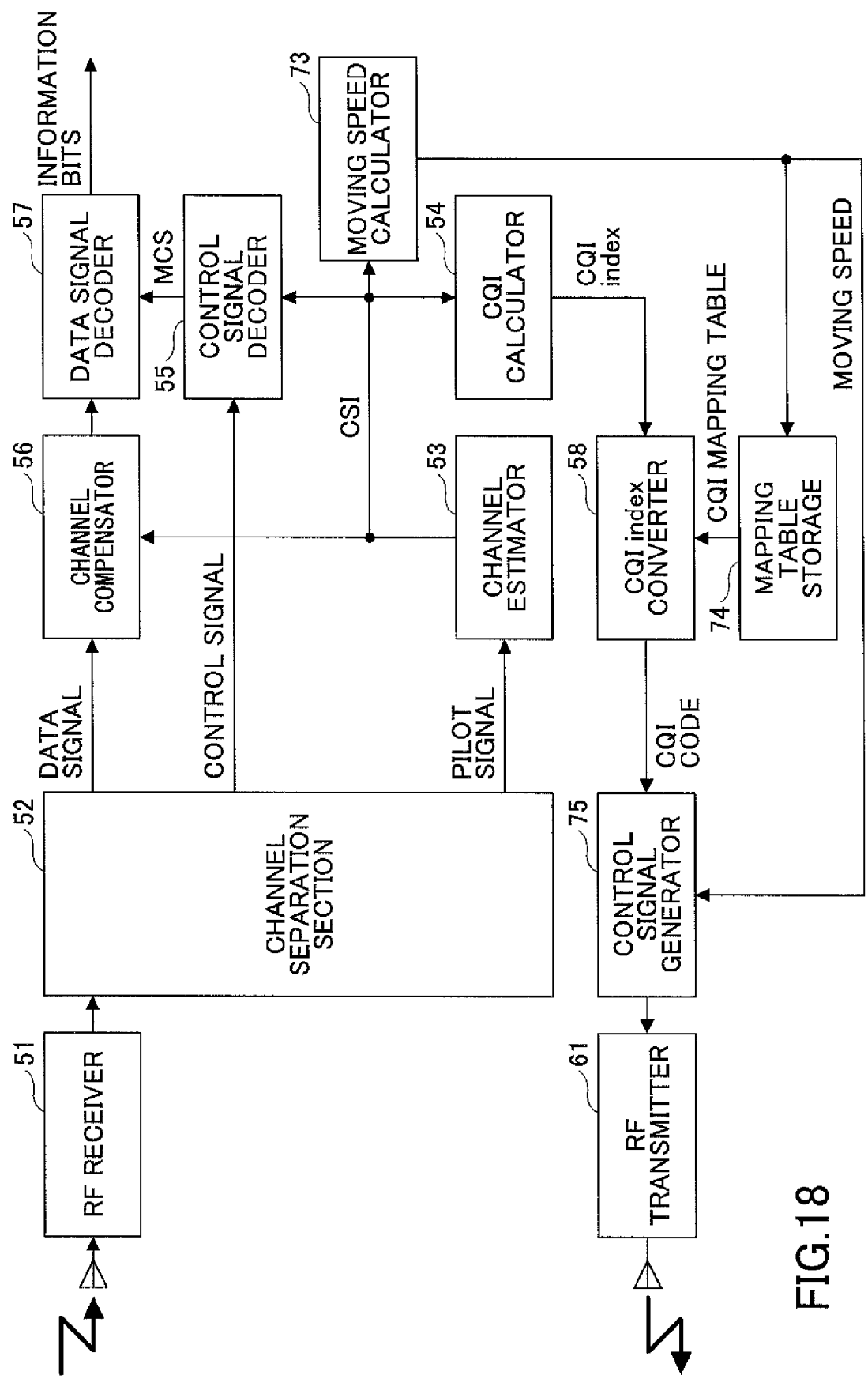
FIG. 18 is an example configuration of the mobile station according to the fourth embodiment.

FIG. 18 illustrates an example configuration of the mobile station according to the fourth embodiment. In FIG. 18, the same reference numerals area used to describe the same elements as those in FIG. 6. In FIG. 18, the RF receiver 51 receives a signal transmitted from the base station, converts the radio-frequency signal to the baseband signal, performs quadrature demodulation and A/D conversion, and transmits the A/D converted signal to the channel separation section 52.

The channel separation section 52 separates the input signal into the data signal, the control signal, and the pilot signal by performing receiving processes (e.g., in case of OFDMA, the FFT timing detecting process, the GI removal process, and the FFT process) on the signal in the predetermined radio access scheme (e.g., OFDMA).

The channel estimator 53 estimates the CSI (Channel State Information) of the radio channel by calculating a correlation value between the pilot signal from the channel separation section 52 and a known pilot signal. The CSI is expressed in a complex number.

The CQI calculator 54 calculates the CQI index based on the radio received quality (e.g., an SINR) estimated using the CSI. Specifically, as described above, the CQI index is calculated so that the BLER is 10% when a data signal having a transmission format corresponding to the CQI is received.

The control signal decoder 55 performs channel compensation on the received control signal from the channel separation section 52 based on the CSI from the channel estimator 53. Further, the control signal decoder 55 restores the control information (including the MCS) by performing data demodulation and error correction decoding.

The channel compensator 56 performs channel compensation on the received data signal from the channel separation section 52 based on the CSI from the channel estimator 53. The data decoder 57 decodes the data based on the modulation indicated in the MCS from the control signal decoder 55, and restores and outputs the information bit data by performing the error correction decoding on the data decoded using the coding rate indicated in the MCS.

A moving speed calculator 73 calculates the moving speed of the mobile station based on, for example, a phase change amount of the CSI per unit time, and generates and output the speed code having, for example, two bits to a mapping table storage 74 and a control signal generator 75. Herein, the speed code is used for selecting the CQI mapping table. Therefore, the speed code may alternatively be called, for example, a CQI mapping code.

The mapping table storage 74 stores, for example, the CQI mapping tables #1, #2, and #3 of FIGS. 7, 9, 11, respectively as the mapping tables optimum for the respective variations of the moving speed of the mobile station. The mapping table storage 74 selects any one of the CQI mapping tables #1, #2, and #3 in accordance with the speed code supplied from the moving speed calculator 73, and supplies the selected CQI mapping table to the CQI index converter 58. For example, when the moving speed is slow and equal to or less than a predetermined speed value, the mapping table storage 74 selects the CQI mapping tables #2. On the other hand, for example, when the moving speed is fast and exceeds the predetermined speed value, the mapping table storage 74 selects the CQI mapping tables #1 (or #3).

The CQI index converter 58 determines the CQI code based on the CQI index calculated by the CQI calculator 54 and by referring any one of the CQI mapping tables #1, #2, and #3 from the mapping table storage 74. The CQI index converter 58 supplies the determined CQI code to the control signal generating section 75.

The control signal generating section 75 generates a control signal in accordance with a PUCCH format by performing processes such as coding and data modulation on the control information including the four-bit CQI code and the speed code. The RF transmitter 61 performs D/A conversion and quadrature modulation on the control signal, converts the baseband signal into the radio-frequency signal, and transmits the radio-frequency signal to the base station.

As described above, in the above embodiments, it may become possible to reduce the possibility of missing the detection of the bit error of the CQI code which is transmitted using the physical channel where no CRC bit is added.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that various changes, substitutions, and alterations could be made hereto without departing from the sprit and scope of the invention.

What is claimed is:

1. A communication system comprising a first communication station and a second communication station,
wherein the first communication station comprises:
a transmitter configured to
convert value information into a code value based on relationship information where plural sets of value information are associated with code values such that a difference between first value information corresponding to a first code value and second value information corresponding to a second code value obtained as a result of an error in one bit of the first code value becomes greater than or equal to two, and
transmit the code value converted from the value information to the second communication station, and
wherein the second communication station comprises:
a receiver configured to receive the code value from the first communication station, and
a detector configured to determine that an error has occurred in the code value received from the first communication station when a difference between value information corresponding to a code value received previously and the value information corresponding to the code value received presently is greater than a predetermined value which is equal to or greater than two.

2. An information transmission method for a communication system in which value information acquired in a first communication station is converted into a value of a code having a predetermined length, and in which a control signal including the value of the code is transmitted to a second communication station, and the value of the code received by the second communication station is converted into the value information, the information transmission method comprising:
setting the code so that a difference between a value of the value information converted from the value of the code when an error occurs in a predetermined number of bits of the code and a value of the value information converted from the value of the code when no error occurs in the code exceeds a predetermined value which is equal to or greater than two, and
determining, by the second communication station, that the value of the code presently received is erroneous when determining that a difference between the value information converted from the value of the code presently received and the value information converted from the value of the code previously received exceeds a predetermined value which is equal to or greater than two.

3. The information transmission method according to claim 2, further comprising:
preparing plural kinds of codes having the predetermined length corresponding to combinations of the predetermined number of bits and the predetermined value,
converting, by the first communication station, the value information into the value of the code by selecting one kind of the code from among the plural kinds of the codes based on the number of total bits of the control signal, and
converting, by the second communication station, the value of the code into the value information by selecting one kind of the code from among the plural kinds of the codes based on the number of total bits of the control signal and by extracting the value of the code from the control signal.

4. The information transmission method according to claim 2, further comprising:
preparing plural kinds of codes corresponding to combinations of the predetermined number of bits and the predetermined value,
converting, by the first communication station, the value information into the value of the code by selecting one kind of the code from among the plural kinds of the codes based on a moving speed of the first communication station,
transmitting, by the first communication station, the control signal to the second communication station, the control signal including the value of the code and a code having a predetermined length converted from the moving speed, and
converting, by the second communication station, the value of the code into the value information by selecting one kind of code from among the plural kinds of the codes based on the moving speed extracted from the control signal and by extracting the value of the code from the control signal.

5. The information transmission method according to claim 2,
wherein the value information is channel quality information, and
wherein the first communication station is a mobile station and the second communication station is a base station.

6. The information transmission method according to claim 5, in the code, the predetermined number of bits is one and the predetermined value is three.

7. The information transmission method according to claim 5, in the code, the predetermined number of bits is two and the predetermined value is two.

8. The information transmission method according to claim 5, in the code, the predetermined number of bits is three and the predetermined value is three.

9. A code setting method for a communication system, in which value information acquired in a first communication station is converted into a value of a code having a predetermined length, and in which a control signal including the value of the code having the predetermined length is transmitted to a second communication station, and the value of the code received by the second communication station is converted into the value information, the code setting method comprising:
setting a code having a predetermined length so that, in the code, a difference between a first value information and a second value information exceeds a predetermined value which is equal to or greater than two,
converting the first value information from the value of the code when an error occurs in a predetermined number of bits of the code, and
converting the second value information from the value of the code when no error occurs in the code having the predetermined length.

10. A second communication station in a communication system, in which value information acquired in a first communication station is converted into a value of a code having a predetermined length and a control signal including the value of the code is transmitted to the second communication station, and in which the value of the code received by the second communication station is converted into the value information, wherein the code is set so that a difference between a first value information and a second value information exceeds a predetermined value which is equal to or greater than two, the first value information being converted from the value of the code when an error occurs in a predetermined number of bits of the code, the second value information being converted from the value of the code when no error occurs in the code, the second communication station comprising:

a control signal receiver configured to receive a control signal transmitted from the first communication station, a converter configured to convert the value of the code included in the control signal received by the control signal receiver into the value information, and a determiner configured to determine that the value of a code presently received is erroneous when determining that a difference between the value information converted from the value of the code presently received and the value information converted from the value of the code previously received exceeds a predetermined value which is equal to or greater than two.

11. A base station in a communication system, in which channel quality information acquired in a mobile station is converted into a value of a code having a predetermined length, a control signal including the value of the code is transmitted to the base station, and the value of the code received by the base station is converted into the channel quality information, wherein the code is set so that a difference between a first value of the channel quality information and a second value of the channel quality information exceeds a predetermined value which is equal to or greater than two, the first value of the channel quality information being converted from the value of the code when an error occurs in a predetermined number of bits of the code, the second value of the channel quality information being converted from the value of the code when no error occurs in the code, the base station comprising:

a control signal receiver configured to receive a control signal transmitted from the mobile station, a converter configured to convert the value of the code included in the control signal received by the control signal receiver into the channel quality information, and a determiner configured to determine that the value of the code presently received is erroneous when determining that a difference between the value of the channel quality information converted from the value of the code presently received and the value of the channel quality information converted from the value of the code previously received exceeds a predetermined value which is equal to or greater than two.

12. The base station according to claim 11, further comprising:

a storage configured to store plural kinds of different codes corresponding to combinations of the predetermined number of bits and the predetermined value, and a selector configured to select one kind of the code having the predetermined length from among the plural kinds of the different codes based on the number of total bits of the control signal, and supply the one kind of code to the converter.

13. The base station according to claim 11, further comprising:

a storage configured to store plural kinds of different codes corresponding to combinations of the predetermined number of bits and the predetermined value, and a selector configured to select one kind of the code from among the plural kinds of the different codes based on information of moving speed extracted from the control signal, and supply the one kind of code to the converter.

14. A first communication station in a communication system, in which value information acquired in the first communication station is converted into a value of a code having a predetermined length and a control signal including the value of the code is transmitted to a second communication station, and in which the value of the code received by the second communication station is converted into the value information, wherein the code having is set so that a difference between a first value information and a second value information exceeds a predetermined value which is equal to or greater than two, the first value information being converted from the value of the code when an error occurs in a predetermined number of bits of the code, the second value information being converted from the value of the code when no error occurs in the code, the first communication station comprising:

a control signal generator configured to generate the control signal by converting the value information into the value of the code, and a control signal transmitter configured to transmit the control signal to the second communication station.

15. A mobile station in a communication system, in which channel quality information acquired in the mobile station is converted into a value of a code having a predetermined length and a control signal including the value of the code is transmitted to a base station, and in which the value of the code received by the base station is converted into the channel quality information, wherein the code is set so that a difference between a first value of the channel quality information and a second value of the second channel quality information exceeds a predetermined value which is equal to or greater than two, the first value of the channel quality information being converted from the value of the code when an error occurs in a predetermined number of bits of the code, the second value of the channel quality information being converted from the value of the code when no error occurs in the code, the mobile station comprising:

a control signal generator configured to generate the control signal by converting the channel quality information into the value of the code, and a control signal transmitter configured to transmit the control signal to the base station.

16. The mobile station according to claim 15, further comprising:

a storage configured to store plural kinds of different codes corresponding to combinations of the predetermined number of bits and the predetermined value, and a selector configured to select one kind of the code from among the plural kinds of the different codes based on the number of total bits of the control signal, and supply the one kind of code to the control signal generator.

17. The mobile station according to claim 15, further comprising:

a storage configured to store plural kinds of different codes corresponding to combinations of the predetermined number of bits and the predetermined value, and a selector configured to select one kind of the code from among the plural kinds of the different codes based on information of moving speed of the mobile station, and supply the one kind of code to the control signal generator.

18. A communication system comprising a first communication station and a second communication station, wherein the first communication station comprises:
- a transmitter configured to convert value information acquired in the first communication station into a value of a code having a predetermined length, and transmit a control signal including the value of the code to the second communication station where the value of the code is converted into the value information, wherein the transmitter sets the code such that a difference between a value of the value information converted from the value of the code when an error occurs in a predetermined number of bits of the code and a value of the value information converted from the value of the code when no error occurs in the code exceeds a predetermined value which is equal to or greater than two; and wherein the second communication station comprises:
- a receiver configured to receive the control signal from the first communication station, and
- a detector configured to determine that the value of the code presently received is erroneous when determining that a difference between the value information converted from the value of the code presently received and the value information converted from the value of the code previously received exceeds a predetermined value which is equal to or greater than two.

* * * * *